W. O. HEATH.
DRAFT EQUALIZER.
APPLICATION FILED OCT. 9, 1920.
1,396,202.
Patented Nov. 8, 1921.
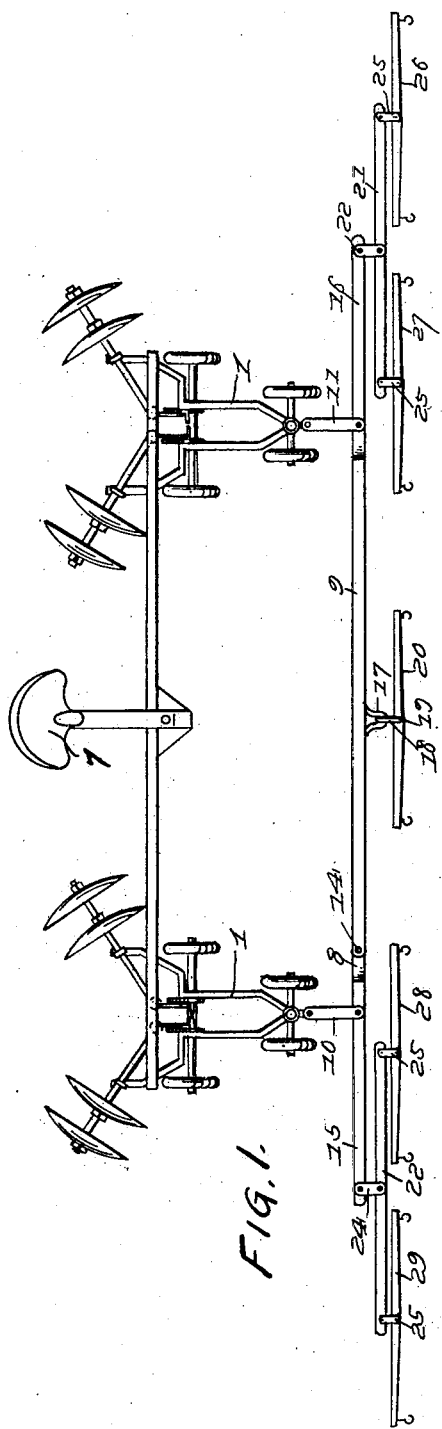
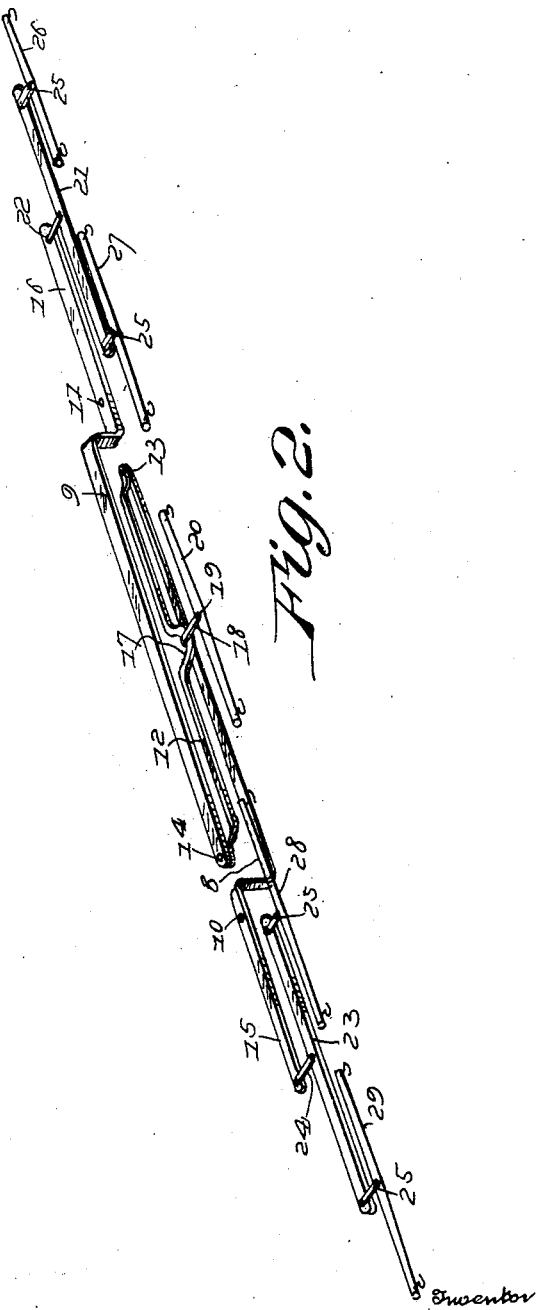
Inventor
W. O. Heath,
By Watson E. Coleman
Attorney

UNITED STATES PATENT OFFICE.

WILLIAM O. HEATH, OF STAFFORD, KANSAS.

DRAFT-EQUALIZER.

1,396,202.   Specification of Letters Patent.   Patented Nov. 8, 1921.

Application filed October 9, 1920. Serial No. 415,762.

*To all whom it may concern:*

Be it known that I, WILLIAM O. HEATH, a citizen of the United States, residing at Stafford, in the county of Stafford and State of Kansas, have invented certain new and useful Improvements in Draft-Equalizers, of which the following is a specification, reference being had to the accompanying drawings.

The purpose of this invention is to provide a draft equalizer, wherein connections are afforded for what is known as a "ridge buster," in order to equalize the draft on the animals.

A further purpose is to provide equalizing elements or beams overlapping, with connecting means between its overlapping ends, and equalizing beams or elements connected with the remote ends of the overlapping beams, thereby equalizing the draft on the animals.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved equalizer as applied to the "ridge buster."

Fig. 2 is a perspective view of the draft equalizer disconnected from the "ridge buster."

Referring more especially to the drawings, 1 designates a "ridge buster" for breaking the ridges, clods, and generally leveling and listing the surface of the soil. A seat 7 is mounted on the "ridge buster" for the operator.

The draft equalizer comprises equalizing beams 8 and 9, which are connected respectively at 10 and 11 to the "ridge buster." These draft equalizing beams have their adjacent portions overlapping as shown, and interposed between the overlapping parts is an equalizer beam 12. One end of the beam 12 is connected at 13 to the end of the underlapping beam 8, while the other beam 12 is connected at 14 to the overlapping end of the beam 9. In order that the end portions 15 and 16 of the beams 8 and 9 may operate in alinement, the other portions of the beams 8 and 9 are off-set, for instance above and below the portions 15 and 16. The equalizing beam 12 is provided with a central loop 17, to which a link 18 is connected. The link 8 is in turn pivoted at 19 to a single tree 20. A double tree 21 is connected at 22 to the end portion 16 of the equalizing beam 9, while a double tree 23 is connected by the links 24 to the extremity of the end portion 15 of the equalizer 8. The double trees 21 and 23 have connected thereto as at 25 single trees 26, 27, 28 and 29. From the foregoing it will be seen that a five horse draft equalizer is provided, and one which is thoroughly capable of operating the "ridge buster," operable on opposite sides of the road bed, so that the machines may be kept in proper position, and at the same time the draft on the animals is equalized.

The invention having been set forth, what is claimed as being useful is:—

1. In a draft equalizer, a pair of main equalizing beams, having upper and lower offset portions, said offset portions overlapping each other and extending in parallel alinement with the remote ends of the main beams, a link equalizing beam connecting the remote ends of said overlapping offset portions and having a loop provided with a single tree, said main equalizing beams adjacent to and offset laterally from said offset portions having link connections with ridge breaking machines, whereby the main equalizing beams may move in parallel alinement and transversely of the line of travel of said machines, as the link equalizing beam moves forwardly and rearwardly incident to the pull of the draft animal on said single tree, and double trees respectively carrying single trees connecting with the remote ends of the main equalizing beams.

2. In a draft equalizer, a pair of main equalizing beams having offset parts, said offset parts being overlapped, each of said equalizing beams at a point remote from the offset portions adapted to be connected to a ridge breaking machine, an equalizing beam connecting the overlapping parts and having a loop, a single tree carried by the connecting beam, double trees carried by the remote ends of the main equalizing beams, and single trees carried by the double trees.

In testimony whereof I hereunto affix my signature.

WILLIAM O. HEATH.